July 7, 1942.  W. B. GOODMAN ET AL  2,289,261
FUEL DISTRIBUTOR
Filed June 10, 1939
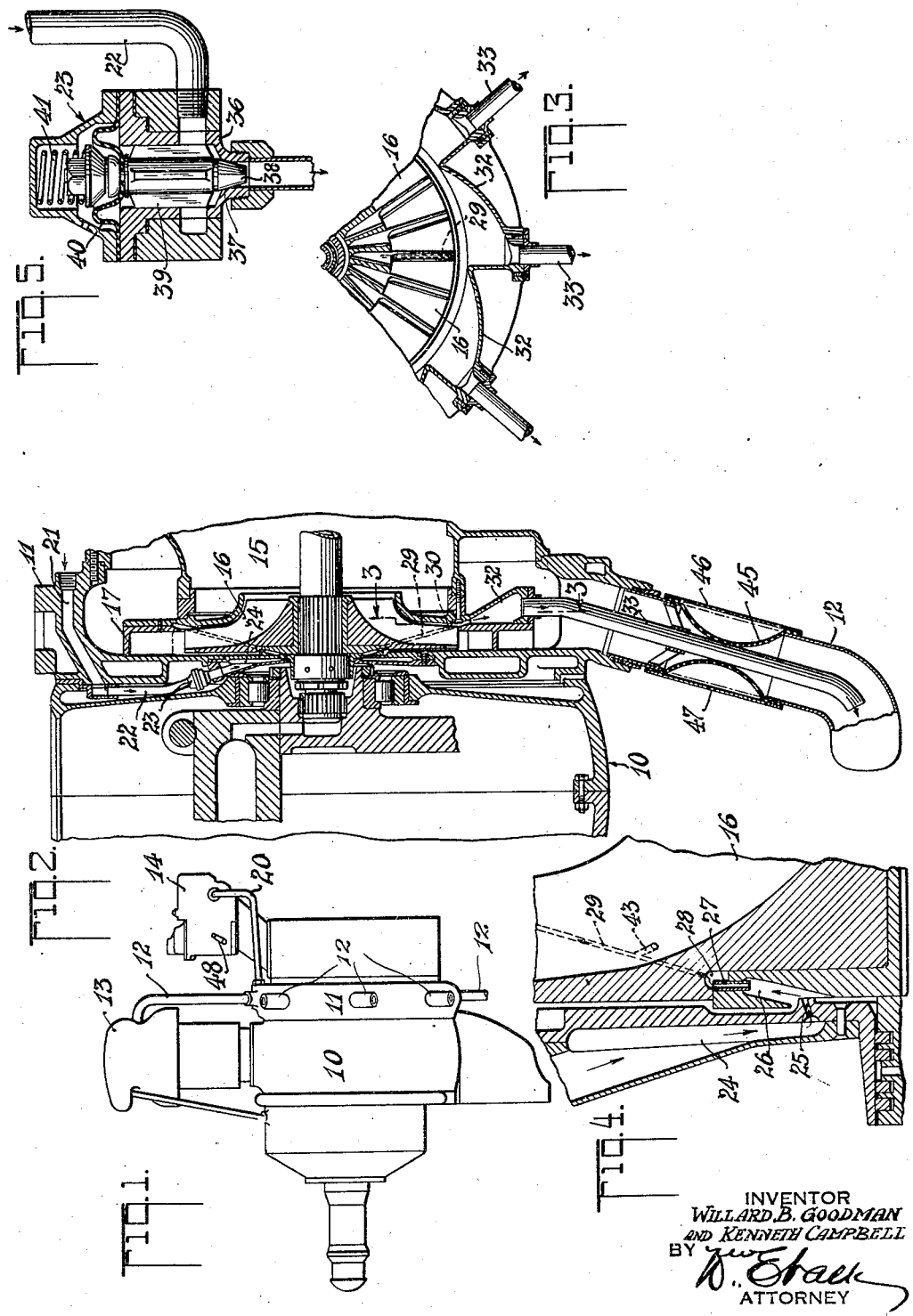
INVENTOR
WILLARD B. GOODMAN
AND KENNETH CAMPBELL
BY
ATTORNEY Patented July 7, 1942

2,289,261

UNITED STATES PATENT OFFICE 2,289,261

FUEL DISTRIBUTOR

Willard B. Goodman and Kenneth Campbell, Radburn, N. J., assignors to Wright Aeronautical Corporation, a corporation of New York Application June 10, 1939, Serial No. 278,410

11 Claims. (Cl. 123—119)

This invention relates to internal combustion engines and is concerned particularly with the fuel distributing systems thereof. An object of the invention is to provide means by which liquid fuel may be uniformly distributed to the several cylinders of a multi-cylinder engine, an associated object being to utilize a supercharger impeller of a supercharged engine for this purpose. A further object is to provide, in connection with an engine supercharger, a liquid fuel feed system coordinated with the supercharger by which liquid fuel is delivered through the supercharger impeller to be mixed with the air charge after the pressure of the latter has been raised by supercharging. A further object is to distribute liquid fuel centrifugally and to assure uniform amounts of fuel reaching the several engine cylinders by providing arcuate receivers, one for each cylinder, equally spaced around the circumference of the centrifugal distributor. A further object is to provide a liquid fuel distributing system which is independent, at the point of delivery of fuel into the airstream, of air pressure conditions thereat. An additional object is to provide automatic means by which the velocity of airflow in the induction system may be maintained at a high level regardless of engine speed and throttle opening.

Further objects of the invention will be apparent in reading the annexed description in connection with the claims, in which Fig. 1 is a side elevation of a radial cylinder aircraft engine with which the invention is adapted for use;

Fig. 2 is an enlarged section through the supercharger compartment of the engine of Fig. 1, showing the invention in greater detail;

Fig. 3 is a fragmentary section on the line 3—3 of Fig. 2;

Fig. 4 is a fragmentary enlargement of the central part of the supercharger impeller, and Fig. 5 is an enlarged sectional elevation of a fuel admission valve.

In the conventional induction system for air-cooled radial engines, intake air first passes through a carburetor which adds liquid fuel in proper proportion to the air, whence the fuel-air mixture passes to the eye of the supercharger, the latter boosting the mixture pressure and distributing the mixture through a diffuser to the several engine cylinders which are connected to the cylinder by suitable intake pipes. With this system it has been found extremely difficult at times to attain complete uniformity of the fuel air mixture as it is delivered to each of the several engine cylinders. In spite of the assistance which the supercharger gives in homogenizing the mixture, the position of the carburetor relative to the supercharger eye and the form and arrangement of the diffuser and intake pipes will usually have a tendency to provide certain of the engine cylinders, consistently, with a mixture somewhat richer than that supplied to other cylinders.

Now there are available fuel metering devices in which metered amounts of liquid fuel may be carried to any part of the induction system without depending upon Venturi suction for withdrawal of the fuel from the carburetor and with such devices the carburetor as such may be located at any convenient point and the metered fuel may be delivered to the engine at any other point.

Now referring more particularly to the devices of this invention we show an engine 10 having a supercharger section 11 from which intake pipes 12 lead to the several engine cylinders 13. The fuel metering device is indicated at 14, this device being of a type such as that shown in the application, Serial No. 94,534, filed August 6, 1936, in the name of K. A. Browne, which matured into Patent No. 2,165,447 on July 11, 1939. Intake air passes through the metering device and leads to the eye 15 of the supercharger impeller 16 whence it is delivered through a diffuser 17 to the intake pipes 12. The metering device by suitable mechanism therein, controls fuel flow in proportion to the mass of air flowing through the metering device and delivers the metered fuel through a pipe such as 20 to a passage 21 formed in the supercharger housing 11. This passage leads through a pipe 22 to a fuel admission valve 23, shown in detail in Fig. 5, whence the liquid fuel passes into an annular cavity 24 adjacent that side of the impeller 16 remote from the air passages therein. Liquid thence passes through one or more drillings 25 into an annular catch slot 26 formed in a bushing on the back of the impeller, this catch slot having restricted orifices 27 registering with an annular cavity 28 from which slanted radial drillings 29 lead the fuel outwardly, through the impeller blades, to deliver fuel at the outer edge of the impeller as at 30. Secured to the diffuser unit 17 are a plurality of receivers 32, equal in number to the number of engine cylinders, these receivers being circumferentially arranged and having an arcuate embracement substantially equal to 360 degrees divided by the number of engine cylinders. From the receivers 32 fuel delivery tubes 33 lead into the respective intake pipes 12, the tubes 33 being preferably concentric with the intake pipes 12 and extending a substantial distance therealong as shown in Fig. 2. The fuel remains in a liquid state as it passes through the radial drillings 29, but upon leaving the impeller periphery it is mixed with a limited quantity of air which leaks past the clearance between the impeller shroud and the diffuser plate. Thus a rich mixture of liquid fuel and air passes through the receivers 32 and tubes 33.

Returning briefly to the fuel admission valve 23 shown in Fig. 5, this unit comprises a housing 36 having a valve seat 37 formed at the outlet end thereof upon which a valve 38 may seat. The valve is guided by vanes 39 in the bore of the housing and is provided at its upper end with an elastic diaphragm 40 sealed thereto and to the housing. Above the diaphragm 40 a light spring 41 serves to hold the valve in seated position. When fuel is delivered to the valve unit from the line 22, and when pressure builds up in the housing to a sufficient degree, such pressure will act upon the diaphragm 40 to unseat the valve 38 and permit of fuel flow to the impeller. This valve serves to prevent pressure changes adjacent the impeller hub being reflected into the metering device 14 which might cause unwanted variations in the amount of fuel metered thereby, and the valve is likewise located close to the impeller hub so that the fuel lines 20, 21, 22 are always full, preventing premature fuel vaporization.

As the metered fuel passes to the impeller catch slot 26, the fuel is leveled off in said slot by centrifugal action and is forceably hurled through the orifices 27 and the drillings 29 as the impeller rotates at high speed. Since the impeller speed is several times the engine speed, the liquid fuel spraying from the outer ends of the drillings 29 is distributed uniformly around the circumference of the impeller and by the provision of the arcuate receivers 32 in this zone, a uniform amount of liquid fuel is assured for each engine cylinder without respect to assymetry of the impeller housing. If, by test, it should be found that any particular cylinders are receiving more or less fuel than they should, this matter may readily be adjusted by slightly varying the arcuate embracement of the receivers 32.

In connection with the restricted orifices 27 shown in Fig. 4, the inner end of this part may project slightly inboard of the outer surface of the catch slot 26 to assure a leveling off of the fuel in the annulus due to centrifugal force before the fuel is passed to the engine. The orifices 27 will be of such size as to retain a substantial amount of fuel in the catch slot under low R. P. M. and high fuel feed operation, the amount of fuel so retained becoming less as R. P. M. is increased and/or fuel is decreased, but in any normal operation, the inner ends of the orifices 27 will be covered with liquid fuel to assure even feed thereof to the impeller. Differences in depth of liquid fuel in the catch slot 26 produce differences in the centrifugal head on the orifices 27, controlling the flow through the latter. Air bleed may if desired be provided to the drillings 29 by bleed holes 43 connecting same with the impeller air passages.

The supercharger per se delivers fresh air into the diffuser 17 and thence into the intake pipes 12 whereupon the aforesaid finely atomized fuel is delivered thereto through the tubes 33.

In the intake pipe 12 is shown a short section of elastic tubing 45 which serves as an auxiliary automatic throttle valve to cut down airflow from the supercharger under engine idling conditions. As shown, the tube 45 is embraced by a metallic tube 46 vented at 47. Under idling conditions manifold pressure is less than atmospheric and hence, atmospheric pressure will force the tube 45 inwardly to engage the fuel tube 33 thus stopping off air bleed through the supercharger and diffuser and enforcing high velocity flow through the tube 33. When the carburetor throttle, indicated at 48, is open, the supercharger boost causes pressure in the intake pipe 12 greater than atmospheric whereupon the tube 45 will be expanded to allow free flow of air therethrough, at the high velocity enforced by the supercharger impeller. In this condition of operation high velocity will still maintain through the fuel tube 33 since there will be an air bleed from the impeller blade tips, along with the fuel, into the receivers 32 as well as the aforementioned air bleed through the drillings 43, if used. The metal tube 46 embracing the tube 45 prevents the possibility of the tube blowing out in case of engine backfire, or of distending when the manifold pressure is greater than atmospheric.

The benefits obtainable with an induction system as above described include improved mixture distribution, control of characteristics of mixture distribution, improved distribution at low operating speeds, reduced throttle sensitiveness at low operating speeds, ability to operate on less volatile fuel, and improved atomization of the liquid fuel.

While we have described our invention in detail in its present preferred embodiment, it will be obvious to those skilled in the art, after understanding our invention that various changes and modifications may be made therein without departing from the spirit or scope thereof. We aim in the appended claims to cover all such modifications and changes.

We claim as our invention:

1. A supercharger for a multi-cylinder engine, comprising an impeller having an air entrance and a fuel entrance, passages in the impeller for air and fuel respectively, intake pipes for the cylinders into which air is discharged from the impeller, a plurality of circumferentially disposed receivers around the impeller into which said fuel passages discharge, and a duct from each receiver to an intake pipe.

2. An engine supercharger comprising an impeller having an air entrance and a fuel entrance substantially radial passages in the impeller for air and fuel respectively, a diffuser into which air is discharged from the impeller, a plurality of circumferentially disposed receivers around the impeller into which said fuel passages discharge, intake pipes leading from said diffuser to the engine, and conduits leading from said receivers into respective intake pipes for discharge thereto.

3. An engine supercharger comprising an impeller having an air entrance and a fuel entrance, substantially radial passages in the impeller for air and fuel respectively, a diffuser into which air is discharged from the impeller, a plurality of circumferentially disposed receivers around the impeller into which said fuel passages discharge, intake pipes leading from said diffuser to the engine, conduits leading from said receivers into respective intake pipes for discharge thereto, and pressure responsive valves in said intake pipes for closing said pipes when the amount of air delivered by said supercharger is small and the pressure in said pipes is low, whereby substantially the entire supercharger delivery is diverted through said receivers to said tubes.

4. In a multi-cylinder engine, means for feeding air thereto including an intake pipe for each cylinder, a fuel metering device, an engine driven centrifugal fuel impeller to the inner part of which fuel is fed from said metering device, arcuate receivers, equal in number to the number of cylinders, circumferentially arranged around said impeller to which fuel is centrifugally discharged, and ducts leading from said receivers to the intake pipes of respective cylinders, the arcuate embracement of respective receivers being such as to insure uniformity of fuel distribution to respective cylinders.

5. In a charge delivery system for a supercharged engine comprising a cylinder and an air intake pipe therefor, a delivery tube for a rich fuel-air mixture coaxial with the pipe, and an annular membrane embracing the tube and within the pipe movable to close or open the pipe for air passage without directly affecting flow through the tube, said membrane being subject on its inner face to pipe pressure and on its outer face to atmospheric pressure, and being responsive in its opening and closing to the difference between said pressures.

6. In a charge forming system for a multi-cylinder engine, a rotary driven member having pumping passages for air and separate pumping passages for fuel, means for conducting pumped air to respective engine cylinders, a plurality of serially arranged receivers disposed around the driven member fuel passage outlets, and means to deliver fuel discharged to the receivers, to the air conducting means of respective engine cylinders.

7. In an internal combustion engine including a supercharger comprising an impeller, a fuel metering device, a catch annulus in a part of the impeller separated from the intake airstream, said impeller having passages connecting the annulus with the impeller periphery, receivers around the impeller into which said impeller discharges fuel, there being one such receiver for each cylinder, air intake pipes leading from the supercharger to the cylinders, and ducts from said receivers to respective intake pipes.

8. In an internal combustion engine including a supercharger comprising an impeller, a fuel metering device, a catch annulus in a part of the impeller separated from the intake airstream, said impeller having passages connecting the annulus with the impeller periphery, receivers around the impeller into which said impeller discharges fuel, there being one such receiver for each cylinder, air intake pipes leading from the supercharger to the cylinders, and ducts from said receivers to respective intake pipes, said ducts extending into said intake pipes and discharging fuel thereto close to the engine cylinders.

9. In an engine induction system, an impeller having separate passages for air and for liquid fuel, a chamber into which the impeller discharges air, air pipes leading from said chamber to the engine cylinders, receivers disposed around the impeller fuel passages equal in number to the number of engine cylinders, a fuel pipe from each receiver to one of said air pipes, and means to deliver liquid fuel to the impeller fuel passages.

10. In an engine induction system, an impeller having separate passages for air and for liquid fuel, a chamber into which the impeller discharges air, air pipes leading from said chamber to the engine cylinders, receivers disposed around the impeller fuel passages equal in number to the number of engine cylinders, a fuel pipe from each receiver to one of said air pipes, and means to deliver liquid fuel to the impeller fuel passages, said fuel receivers comprising substantially equal arcuate pockets serially disposed about the impeller.

11. In a multi-cylinder engine, means for feeding air to the engine cylinders including an intake duct for each cylinder, a fuel metering device, a fuel impeller including means to drive same, means to feed fuel to said impeller from the metering device, serially arranged receivers disposed around the impeller and equal in number to the number of engine cylinders to which fuel is discharged from said impeller, and ducts leading from said receivers to the intake ducts of respective engine cylinders.

WILLARD B. GOODMAN.
KENNETH CAMPBELL.